United States Patent [19]

Biggs

[11] Patent Number: 5,256,488
[45] Date of Patent: Oct. 26, 1993

[54] NON-TARNISHING FLAME RETARDANT INSULATION COMPOSITIONS

[75] Inventor: James W. Biggs, Lebanon, Ohio

[73] Assignee: Quantum Chemical Corporation, Cincinnati, Ohio

[21] Appl. No.: 37,971

[22] Filed: Mar. 29, 1993

Related U.S. Application Data

[62] Division of Ser. No. 721,041, Jun. 26, 1991.

[51] Int. Cl.$^5$ ............................................. B32B 27/30
[52] U.S. Cl. .................... 428/463; 428/522; 524/265; 524/303; 524/305
[58] Field of Search .................. 524/265, 303, 305; 428/463, 522

[56] References Cited

U.S. PATENT DOCUMENTS

4,381,362  8/1981  Biggs ................................... 524/303

*Primary Examiner*—Joseph L. Schofer
*Assistant Examiner*—Jeffrey T. Smith
*Attorney, Agent, or Firm*—Kenneth D. Tremain; Gerald A. Baracka

[57] ABSTRACT

The present invention relates to improved flame retardant insulation/jacketing compositions for wire and cable products based on ethylene-vinyl ester and ethylene-alkyl acrylate copolymers. The copolymers are formulated with a hydrated inorganic filler, an alkoxysilane, a crosslinking agent, a processing additive and a combination of specific antioxidants, namely, a pentaerythritol betaalkylthiopropionate and a hindered phenol. The formulations stabilized with the pentaerythritol betaalkylthiopropionate/hindered phenol combination have good heat stability and do not tarnish or discolor the surface of the copper conductor upon steam vulcanization.

12 Claims, No Drawings

NON-TARNISHING FLAME RETARDANT INSULATION COMPOSITIONS

CROSS-REFERENCE TO RELATED APPLICATIONS

This is a division of application Ser. No. 07/721,041, filed Jun. 26, 1991.

BACKGROUND OF THE INVENTION

1. Field of the Invention

This invention relates to polymeric insulation compositions which are crosslinked to produce heat resistant and flame resistant products useful for coating wire and cable products. More particularly, the invention relates to crosslinkable flame retardant ethylene-vinyl ester and ethylene-alkyl acrylate copolymer insulation compositions which do not tarnish the surface of copper conductors upon curing.

2. Description of the Prior Art

One of the most important uses of fire resistant polymer compositions is for wire and cable insulation. In electrical environments both insulating and fire resistant properties are considered to be necessary. Furthermore, the physical properties of the insulation should not deteriorate under the service conditions encountered. Various antioxidants/stabilizers are therefore added to the formulations so that they meet the service requirements.

A particularly important type of fire retarding insulation which is widely used by the wire and cable industry is comprised of a crosslinkable polymer, such as ethylene-vinyl acetate copolymer, one or more silanes, one or more hydrated inorganic fillers, and a crosslinking agent. Additives such as pigments, processing oils, lubricants, stabilizers and antioxidants are also generally included in the formulations. Such compositions are disclosed in U.S. Pat. Nos. 3,832,326 and 3,922,442 to North et al and U.S. Pat. Nos. 4,349,605 and 4,38i,362 to Biggs et al. The compositions of North et al and Biggs et al find particular use as insulation compositions which can be extruded onto copper conductors to provide a single layer insulating and jacketing composition which meets the automotive primary SAE J1128 standards and UL 125° C. appliance wire and UL 44 SIS standards. The compositions exhibit a good balance of processability, improved physical and electrical properties together with a high degree of flame and fire retardance. Moreover, these results are achieved (a) without the use of halogenated flame retardant additives thereby eliminating the potential for generating dangerous hydrogen halide fumes; (b) without the use of carbon black thereby making it possible to formulate colored insulations; (c) without the application of flame retardant coatings thereby eliminating the need for an additional step in manufacturing operations after the insulating compound is extruded onto the conductor; and (d) without the use of antimony trioxide thereby eliminating the need to use a substantial quantity of an expensive compounding ingredient.

Antioxidants disclosed in the North et al and Biggs et al references include polymerized 1,2-dihydro-2,2,4-trimethyl quinoline, distearyl-3,3'-thiodiproponate (DSTDP), and combinations of DSTDP with hindered phenols, such as tetrakis [methylene(3,5-di-t-butyl-4-hydroxyhydrocinnamate)]methane. Use of DSTDP with sterically hindered phenols is disclosed in U.S. Pat. No. 4,381,362 for the preparation of compositions which pass the CSA varnish test. Other thio compounds, such as dilauryl-3,3'-thiodipropionate, dimyristylthiodipropionate, ditridecylthiodipropionate, bis alkyl sulfides, and hindered phenols, such as 2,6-di-t-butyl-p-cresol, octadecyl 3,5-di-t-butyl-4-hydroxyhydrocinnamate, 2,2'-methylene bis(6-t-butyl-4-methylphenol), 4,4'-butylidene bis(6-t-butyl-3-methyl phenol), 1,3,5-trimethyl-2,4,6-tris(3,5-di-t-butyl-4-hydroxybenzyl) benzene, and 2,2'-methylene bis(4-methyl-6-t-butylphenol) have also been disclosed.

While it is possible to obtain effectively stabilized white formulations using combinations of dialkylthiodipropionates and hindered phenols, discoloration of the copper conductor has been observed when the insulated wire or cable is cured using steam. While the exact nature of the discoloration or tarnish is not known, its presence on the surface of the conductor presents a problem when making connections by soldering or welding, such as in the manufacture of electrical boards or harnesses. The absence of a clear, shiny metal surface can result in defective connections and is a particular problem in automated systems. With sonic welding, for example, the presence of tarnish on the conductor surface makes it necessary to increase the power to achieve reliable welds. This, of course, results in higher cost and can lead to other problems.

Since continuous vulcanization (CV) procedures which utilize steam are widely used by wire and cable manufacturers, it would be desirable if a stabilizer package which did not tarnish the surface of the conductor were available for formulations containing organic peroxide crosslinking agents. Whereas certain combinations of thio compounds and hindered phenols do not discolor the copper conductor, they have other disadvantages. For example, bisalkyl sulfide/hindered phenol combinations do not tarnish the conductor but, at the level necessary to obtain effective stabilization, they have blooming and odor problems. It would be highly advantageous if an effective thio compound/hindered phenol stabilizer combination were available which could be formulated to produce essentially white compositions and which upon steam curing did not discolor the copper conductor or produce undesirable blooming or objectionable odor.

SUMMARY OF THE INVENTION

It is an object of this invention to provide improved crosslinkable flame retardant polymeric compositions based on ethylene-vinyl ester copolymers and ethylene-alkyl acrylate copolymers which have good processing characteristics and resistance to oxidative degradation. It is a further object to provide compositions of the above type suitable for use as insulating and jacketing materials which do not tarnish or discolor the copper conductor to which they are applied upon steam curing.

In accordance with the present invention these and other objectives are realized by the use of a two-component stabilizer package comprising a pentaerythritol betaalkylthiopropionate and a hindered phenol. The non-tarnishing flame retardant insulation compositions of the present invention are comprised of (1) a polymer selected from the group consisting of copolymers of ethylene and vinyl esters of $C_{2-6}$ aliphatic carboxylic acids, copolymers of ethylene and $C_{1-6}$ alkyl acrylates, copolymers of ethylene and $C_{1-6}$ alkyl methacrylates, or mixtures thereof; (2) 80 to 400 phr hydrated inorganic filler; (3) 0.5 to 5 phr of an alkoxysilane; (4) 1 to 8 phr chemical crosslinking agent; (5) 0.25 to 8 phr processing additive; and (6) 1 to 8 phr antioxidant package. The antioxidant consists of a mixture of pentaerythritol tetrakis(betaalkylthiopropionate) wherein the alkyl group contains from about 8 to 22 carbon atoms and a hindered phenol, the ratio of said pentaerythritol betaalkylthiopropionate to said hindered phenol ranging from 5:1 to 1:1 on a weight basis. In a particularly useful embodiment of the invention the alkyl group of the pentaerythritol betaalkylthiopropionate will have from 10 to 18 carbon atoms and the hindered phenol will be selected from the group consisting of 4,4'-methylenebis(2,6-di-t-butylphenol); tetrakis[methylene (3,5-di-t-butyl-4-hydroxyhydrocinnamate)]methane; 1,3,5-trimethyl-2,4,6-tris(3,5-di-t-butyl-4-hydroxybenzyl)-benzene; 1,3,5-Tris(3,5-di-t-butyl-4-hydroxybenzyl)-s-triazine 2,4,6(1H,3H,5H)trione; N,N'-bis[3-(3,5-di-t-butyl-4-hydroxyphenyl) propanyl]hydrazine; and octadecyl 3,5-di-t-butyl-4-hydroxyhydrocinnamate.

DETAILED DESCRIPTION

The present invention relates to improved flame retardant insulating compositions comprising copolymers of ethylene and a vinyl ester of an aliphatic carboxylic acid, an alkyl acrylate or an alkyl methacrylate, a silane, a hydrated inorganic filler, a crosslinking agent, a processing additive and a selected antioxidant package. By using a combination of a pentaerythritol betaalkylthiopropionate and hindered phenol as the antioxidant, it is possible to obtain products having excellent long-term stability and which do not cause undesirable discoloration of the surface of the copper conductor to which they are applied when the insulated copper wire or cable product is steam cured.

The terms crosslink, cure and vulcanize and their derivative forms are employed synonymously herein and are ascribed their normal art-recognized meaning, i.e., they denote the formation of primary valence bonds between polymer molecules. Also, the terms antioxidant and stabilizer are used interchangeably to denote compounds which protect the formulation against the combined deleterious effects of heat, air and light. When reference is made to antioxidant or stabilizer packages or mixtures, it is intended that the ingredients may be added to the formulation individually or they may be combined prior to incorporation. All parts and percentages referred to are on a weight basis unless otherwise indicated.

THE ETHYLENE COPOLYMER

The polymeric component of the present compositions is a copolymer of ethylene and a comonomer which may be a vinyl ester or an alkyl acrylate, the latter being used in the generic sense to encompass esters of both acrylic and methacrylic acid. The vinyl ester may be a vinyl ester of a $C_2$-$C_6$ aliphatic carboxylic acid, such as vinyl acetate, vinyl propionate, vinyl butyrate, vinyl pentanoate or vinyl hexanoate. The acrylates may be any of the $C_1$-$C_6$ alkyl esters of acrylic or methacrylic acid including, for example, methyl, ethyl, propyl, butyl, pentyl or hexyl acrylate or methacrylate.

A preferred copolymer comprising the polymeric component of this invention is an ethylene-vinyl acetate copolymer (EVA) containing about 9% to about 45% and, more preferably, 9% to about 30%, vinyl acetate, with the balance being ethylene. Terpolymers of ethylene, vinyl acetate and other known olefinic monomers polymerizable therewith can also be employed. Generally, if a third monomer is present, it will not constitute more than about 15% of the polymer composition.

Another preferred copolymer is derived from the copolymerization of ethylene and butyl acrylate. Useful ethylene-butyl acrylate copolymers (EBA) will contain about 10% to about 45% and, more preferably, 20% to 40% butyl acrylate—the balance being ethylene. n-Butyl acrylate is a preferred comonomer.

Blends of EVA and EBA can also be advantageously utilized. The EVA will generally comprise the major component of the blend, and typically will constitute greater than 75% of the blend.

It is also possible to include minor proportions of other crosslinkable polymers or copolymers in the composition of this invention; however, ethylene copolymers as described above should comprise at least 50% of the total polymers present. Representative of such minor polymeric components which can be used in such embodiments include polyethylene, polypropylene, ethylene-propylene copolymers and terpolymers, and the like. Low density polyethylene and linear low density polyethylene having melt indexes from 0.5 to 5 provide particularly desirable blends when present in amounts of 30% or less, based on the total polymer.

The ethylene copolymers and blends thereof will typically have melt indexes in the range 0.1 to 7 g/10 min. EVA copolymers most generally have melt indexes from about 0.5 to 5 whereas melt indexes of EBA copolymers will generally range from 0.1 to 3.

THE HYDRATED INORGANIC FILLER

Fillers used in the present invention are hydrated inorganic fillers, e.g., hydrated aluminum oxides ($Al_2O_3 3H_2O$ or $Al(OH)_3$), hydrated magnesia, hydrated calcium silicate, hydrated magnesium carbonates, or the like. Of these compounds, hydrated alumina is most commonly employed. The water of hydration present in the inorganic filler must be capable of being released at the temperature where combustion or ignition of the ethylene copolymer begins to occur. While minor amounts of other types of fillers may be tolerated, large amounts of such fillers cannot be utilized.

Since the water of hydration chemically bound to inorganic fillers is released endothermically, the hydrated inorganic fillers impart flame retardance. In fact, they increase flame retardance to a far greater degree than other fillers previously used for this purpose, e.g., carbon black, clays, titanium dioxide, etc. What is even more surprising is that flame retardance is combined with excellent electrical insulation properties at the high filler loadings used. The filler size should be in accordance with those sizes used by the prior art.

THE SILANE COMPONENT

One or more alkoxy silanes are also required for the compositions of the present invention. Any alkoxy silane which does not adversely affect the desired balance of properties and which facilitates binding the polymer and inorganic filler can be used with the proviso that the silane can not be combustible or degrade during polymer processing or interfere with polymer crosslinking.

Alkoxysilanes used in insulating compositions include lower alkyl-, alkenyl-, alkynyl-, and aryl-alkoxysilanes containing from 1 to 3 alkoxy substituents having from 1 to 6 and, more preferably, 1 to 3 carbon atoms. Alkoxysilanes having 2 or 3 $C_{1-3}$ alkoxy substituents, e.g. methoxy, ethoxy, propoxy or combinations thereof, are particularly advantageous. Illustrative silanes include methyltriethoxysilane, methyltris(2-methoxyethoxy)silane, dimethyldiethoxysilane, ethyltrimethoxysilane, vinyltris(2-methoxyethoxy)silane, phenyltris(2-methoxyethoxy)silane, vinyltrimethoxysilane and vinyltriethoxysilane, and gamma-methacryloxypropyltrimethoxysilane.

It is preferred to use vinyl alkoxysilanes. Of the vinyl alkoxysilanes, gamma-methacryloxypropyltrimethoxysilane of the formula

vinyltris(2-methoxyethoxy)silane of the formula

vinyltrimethoxysilane of the formula

vinyltriethoxysilane of the formula

are especially useful. Vinyltrimetho ethoxsilane are particularly advantageous.

THE CROSSLINKING AGENT

The formulated ethylene-vinyl ester and ethylene-alkyl acrylate copolymers can be crosslinked using conventional procedures known to the art such as chemical, thermal or radiation curing. When crosslinked, these polymers exhibit thermoset behavior and provide a superior and unexpected balance of:

(1) low temperature brittleness, i.e., the compositions do not readily crack during low temperature flexing (ASTM D-746);
(2) heat resistance after aging, i.e., excellent elongation after extended service at 90° C., 125° or even 135° C.;
(3) arcing and tracking resistance as high as 5 KV;
(4) resistance to ignition by flame and resistance to combustion;
(5) moisture resistance i.e., low mechanical absorption of water, providing retention of dielectric properties in wet and humid environments;
(6) dielectric properties;
(7) oil resistance; and
(8) resistance to industrial chemicals.

In view of the ability to rapidly achieve high levels of cure using chemical crosslinking agents and the uniformity of the results obtainable therewith, this method is most commonly practiced to cure wire and cable insulation. Chemical crosslinking can be accomplished by the use of conventional agents known to generate free radicals upon decomposition. Organic peroxides are most commonly employed for this purpose. Chemical crosslinking is accomplished by incorporating the organic peroxide or other crosslinking agent into the composition at a temperature below the decomposition temperature and later activating to cure the composition, i.e., crosslink the ethylene copolymer into a three-dimensional network.

This crosslinking is carried out in accordance with well known procedures and variations in the general conditions necessary to effect same will be apparent to those skilled in the art. The invention is not limited to the use of organic peroxides for chemical crosslinking—other art-recognized materials which decompose to provide free radicals can also be used. Obviously such crosslinking agents should not decompose during compounding. Known crosslinking coagents, such as triallylcyanurate and the like, may also be included to increase the effectiveness of the cure.

Tertiary organic peroxides are especially useful chemical crosslinking agents. Dicumyl peroxide and alpha, alpha'-bis(t-butylperoxy) diisopropylbenzene are particularly advantageous. As with most other chemical crosslinking agents, the tertiary organic peroxides are activated by heating to above their activation temperature whereupon decomposition occurs. Any of the known procedures to accomplish decomposition, such as the application of high pressure steam or the like, can be used.

THE PROCESSING ADDITIVE

While any known processing agent can be employed, fatty acids or fatty acid derivatives, polymeric processing resins and hydrocarbon oils, or combinations thereof, are most generally used. The fatty acid derivatives can include metal soaps, esters, ester-soaps, amides, and the like.

The term fatty acid as employed herein, refers to aliphatic carboxylic acids having from 8 to 22 carbon atoms. While these acids are usually derived from natural sources, they can also be synthetically produced. The fatty acids can be branched or straight-chain, saturated or unsaturated and they may consist of a single acid, or as is more commonly the case, a mixture of acids within the specified carbon content range. Illustrative fatty acids include caproic acid, caprylic acid, capric acid, lauric acid, myristic acid, myristoleic acid, palmitic acid, palmitoleic acid, stearic acid, isostearic acid, oleic acid, linoleic acid, eleostearic acid, behenic acid, erucic acid and the like. Useful fatty acid mixtures are obtained from triglycerides present in natural fats and oils including coconut oil, cottonseed oil, linseed oil, palm oil, soy oil, tall oil, safflower oil, corn oil, rapeseed oil, tallow or the like.

While the fatty acids or mixtures may be utilized as such, they are more commonly employed in their derivative forms. Alternatively, a mixture of fatty acid and fatty acid derivative can be used. Especially useful fatty acid derivatives which can be used, alone or in admixture, are the calcium or aluminum soaps and amides, including bis-amides formed by the reaction of two moles of a fatty acid or fatty acid ester with one mole of an aliphatic diamine, e.g., ethylene diamine. Soaps which interfere with the crosslinking reaction (a free radical mechanism), such as zinc soaps, and which react with organic peroxides should be avoided. Acceptable soaps are the alkaline earth metal fatty acid soaps and calcium stearate has been found to be particularly advantageous. Erucamide and ethylene-bis-stearamide are particularly useful fatty acid amides. In one highly useful embodiment of the invention, the fatty component consists of a mixture of a fatty acid with a fatty acid amide present in a ratio from 2:1 to 1:10. Combinations of lauric acid and ethylene-bis-stearamide are most notable in this regard.

Useful hydrocarbon processing oils which can be employed are naphthenic and paraffinic oils. Such oils are obtained from the refining and processing of selected petroleum crude oils and are widely available from commercial sources, such as Sun Refinishing and Marketing Company, Exxon Chemical Americas and Witco Corporation-Golden Bear Division. Hydrocarbon oils employed for these formulations will generally have saturate contents from 50 to 90 percent and the total aromatics content will not exceed 50 percent. Total aromatics contents will most commonly range from 10 to 45 percent. Viscosities of these oils will range from 100 to 2500 SUS at 100° F. and, more preferably, from 200 to 1200 SUS at 100° F.

Polymeric processing additives which can be used are predominantly aliphatic resins having average molecular weights less than about 2000 and containing ester functional groups. The resins are a mixture of oligomers. While the molecular weight distribution of the polymeric products can vary, predominant oligomers will have molecular weights below 2000. A portion of the oligomers comprising the aliphatic resin mixture contain ester functional groups, such as acetoxy groups. The resin mixtures are solid materials having specific gravities from about 0.92 to about 0.98 and softening points from about 90° C. to about 110° C. They exhibit good solubility in aliphatic, aromatic and chlorinated hydrocarbons.

Low molecular weight polymeric processing additives of the above type are conveniently obtained by combining an aliphatic hydrocarbon resin derived from petroleum cracking streams with an ester-containing resin. Both the hydrocarbon resin and ester-containing resin are comprised predominantly of oligomers having molecular weights less than 2000. The ratio of the hydrocarbon resin to ester-containing resin can vary widely depending on the particular resins used. Most commonly, the mixture will contain from 50 to 95% of the hydrocarbon resin and 5 to 50% of the ester-containing resin. More preferably, the hydrocarbon resin will comprise 60 to 92% of the mixture with the ester-containing resin comprising the balance.

Aliphatic hydrocarbon resins utilized for the polymeric processing additive are well known and commercially available. They are produced by the Friedel-Crafts catalyzed polymerization of various mixed olefin streams obtained from petroleum cracking operations. Resin properties will vary depending on composition of the feedstock, the particular catalyst used and reaction conditions. Hydrocarbon resins used for the polymeric processing additives are primarily derived from aliphatic olefin monomers.

The ester-containing resin present with the hydrocarbon resin to make up the polymeric processing modifier is typically an olefin-vinyl ester copolymer. Ethylene-vinyl ester copolymers are especially advantageous with ethylene-vinyl acetate copolymers being particularly preferred. Vinyl acetate contents of these copolymers will range from 12 to 32% and, more commonly, from 15 to 25%.

Minor amounts of other low molecular weight resins, such as polyethylene, may also be present with the hydrocarbon resin and olefin-vinyl ester copolymer. The oligomer mixtures comprising the polymeric processing modifiers will typically contain 80°-90% C, 8-15% H and 0.5-7% O. Polymeric processing modifiers meeting the above requirements are commercially available from Struktol Company under the designations Struktol Polydis® TR060 and Struktol Polydis® SA9001.

If a fatty component is employed with a polymeric or hydrocarbon oil processing additive, the ratio of fatty acid (or derivative) to polymeric/hydrocarbon oil will range from 3:1 to 1:8 and, more preferably, from 2:1 to 1:5.

Also, since it is often advantageous to utilize a mixture of lubricants with different melting points and chemical structures, natural or synthetic hydrocarbon waxes or low molecular weight polyethylenes can also be employed with any of the foregoing additives or mixtures to obtain the desired balance of processing properties.

THE ANTIOXIDANT

To obtain the non-tarnishing formulations of the invention, a combination of two antioxidants is employed. It has unexpectedly been discovered that when a pentaerythritol betaalkylthiopropionate is used with a hindered phenol, discoloration of the copper conductor which is observed with steam vulcanized wire and cable formulations containing a dialkylthiodipropionate antioxidant can be eliminated. Both the pentaerythritol betaalkylthiopropionates and the hindered phenols utilized for the invention are commercially available materials.

The pentaerythritol betaalkylthiopropionate will conform to the general formula

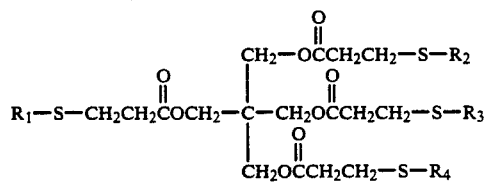

wherein $R_1$, $R_2$, $R_3$ and $R_4$ are alkyl groups having from 8 to 22 carbon atoms. Preferably, $R_1$, $R_2$, $R_3$ and $R_4$ will contain from 10 to 18 carbon atoms. The alkyl moieties may be the same or different and may be branched or linear. In an especially useful embodiment of the invention $R_1$, $R_2$, $R_3$ and $R_4$ are $C_{12}$ alkyl, i.e., lauryl, groups. Pentaerythritol tetrakis(betalalkylthiopropionates) corresponding to the above formula are commercially available from Argus Chemical Division, Witco Chemical Corporation and pentaerythritol tetrakis(betalauryl-thiopropionate) is sold under the trademark SEENOX 412 S.

The hindered phenols used will contain one or more substituted phenyl groups of the formula

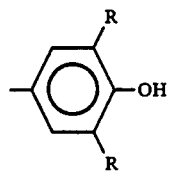

where R is a $C_{1-4}$ alkyl group and, most preferably, a tertiary butyl group. The hindered phenols should be essentially phosphorus-and/or sulfur-free. Where more than one 3,5-dialkyl-4-hydroxyphenyl group is present, they will be joined through a linking group and the resulting compounds will correspond to the formula

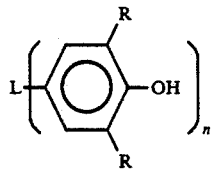

where n is an integer from 2 to 4 an X represents the linking group. The linking group L should not contain sulfur or phorphorus atoms.

Representative linking groups include:

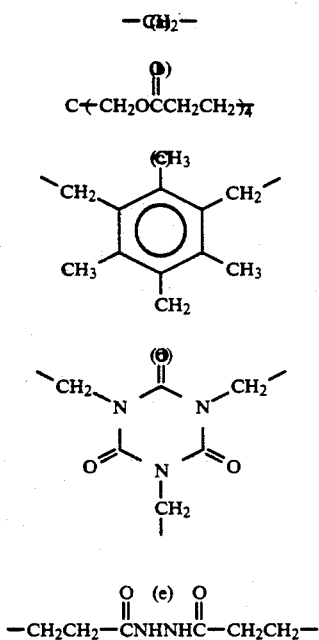

It is especially advantgeous when the above-identified linking moieties are substituted with 3,5-di-b-butyl-4-hydroxylphenyl groups.

Representative hindered phenol compounds which can be employed with the pentaerythritol betaalkylthiopropionate to provide non-tarnishing flame retardant products include:

4,4'-Methylenebis(2,6-di-t-butylphenol)
Tetrakis[methylene (3,5-di-t-butyl-4-hydroxyhydrocinnamate)]methane
1,3,5-Trimethyl-2,4,6-tris(3,5-di-t-butyl-4-hydroxybenzyl)-benzene
1,3,5-Tris(3,5-di-t-butyl-4-hydroxybenzyl)-s-triazine 2,4,6(1H,3H,5H)trione
N,N'-Bis[3-(3,5-di-t-butyl-4-hydroxyphenyl) propanyl]-hydrazine
Octadecyl 3,5-di-t-butyl-4-hydroxyhydrocinnamate All of the foregoing materials are commercially available. Octadecyl 3,5-di-t-butyl-4-hydroxyhydrocinnamate and tetrakis[methylene (3,5-di-t-butyl-4-hydroxyhydrocinnamate)]methane, sold by Ciba-Geigy under the respective trademarks IRGANOX 1076 and IRGANOX 1010, are particularly useful. Combinations of IRGANOX ® 1076 or IRGANOX ® 1010 and SEENOX ® 412 S are employed in formulations which form especially useful embodiments of the invention.

FORMULATING AND PROCESSING THE COMPOSITIONS

The above-described components may be combined in a number of ways. The only requirement is that the filler and silane be intimately contacted. The silane may be added directly to the filler and dispersed in the polymer using a high shear internal mixer such as a Banbury, Farrel Continuous Mixer, Bolling Mixtrumat TM or Werner & Pfleiderer mixer and the crosslinking agent, antioxidants, lubricant(s) and processing agent(s) then added. Alternatively, the silane is first added to the polymer followed by addition thereto of the filler and other additives. All ingredients can be added to the polymer/silane mixture at the same time using this latter approach provided the intensity and duration of the mixing are sufficient to provide intimate contact of the silane and filler.

In addition to the previously mentioned mixers, other processing devices known to the art capable of intimately mixing the essential components may be used. The compositions may also contain other additives, such as carbon black, pigments and the like, provided they do not interfere with crosslinking or detract from the physical properties of the composition. The total amount of any additional ingredients will generally not exceed about 15 phr.

The hydrated inorganic filler in the composition can be varied within wide limits. The filler can range from 80 to 400 parts per 100 parts polymer resin (phr). Most commonly, from 80 to 200 phr filler is employed. The alkoxysilane will range from about 0.5 to 5 phr and, more preferably, from 0.75 to 4 phr. Too small an amount may be insufficient to provide adequate surface treatment of the filler while too large a quantity can have an adverse effect on physical properties, primarily percent elongation, after crosslinking.

The amount of crosslinking agent employed will depend on the degree of crosslinking desired. The higher the degree of crosslinking, the greater the toughness and the higher the resistance to moisture and chemical reagents. When too low a degree of crosslinking is achieved, the physical properties of the product are inadequate and subject to pronounced deterioration upon aging. Insufficient crosslinking results primarily in a deficiency in retention of stiffness at elevated temperature since the material will have too low a softening point. The exact degree of crosslinking is therefore varied to take the above factors and their effect on the final product into account. For wire and cable insulation the level of crosslinking is generally greater than 80% although lower values are possible. Crosslinking is determined by extraction of the crosslinked polymer to measure the amount of insoluble gel. Crosslinking levels of 85% to 95% are most typical. Generally, no more than about 8 phr organic peroxide is necessary and, more commonly, the organic peroxide level will range from 1 to 6 phr. Most preferably, 1.5 to 5 phr organic peroxide is used. Other crosslinking agents may require some variation in the amount used.

The amount of processing additive(s) can be varied over a wide range but will generally be present from 0.25 to 8 phr. The amount and type of processing aid will not only affect processability of the formulation but also can affect the physical properties of the crosslinked material. Improved processability gives the processor greater flexibility in the selection of operating conditions and, in some cases, makes it possible to increase the line speed of the operation. A broadened operating window also makes it possible to accommodate unanticipated changes in processing conditions which frequently occur and which can result in the production of unacceptable product or catastrophic failure, i.e., blowing the extruder head shear rings or freeze-up of the extruder. After crosslinking, the processing additives can influence physical properties and, in some instances, improve retention of physical properties upon heat aging. It is particularly advantageous to employ from 1 to 6 phr processing additive or combination of one or more processing additives of the type previously described.

The amount of the antioxidants will be determined based on the service requirements of the particular application but will generally range from about 0.5 to 8 phr. This is the total amount of both antioxidants, i.e., the pentaerythritol betaalkylthiopropionate and the hindered phenol. Higher levels of antioxidant are generally required for high temperature wire and cable applications. The antioxidants may be added to the formulation separately or combined prior to incorporation. From 1 to 6 phr of the antioxidant package is most commonly employed. The weight ratio of the pentaerythritol betaalkylthiopropionate to hindered phenol can range from about 5:1 to about 1:1 but, more preferably, is from 3:1 to 1.5:1.

While the compositions of the invention can be crosslinked using any conventional procedure, they are most advantageously employed where steam curing procedures are utilized since they do not tarnish the copper conductor as has been observed with dialkylthiodipropionates, such as DSTDP. Steam curing is commonly employed for wire and cable production where continuous operation at high line speeds is required. Continuous vulcanization is generally carried out at superatmospheric pressures, on the order of 100 psi to 400 psi, although higher or lower pressures may be used. These pressures are employed to avoid developing porous crosslinked compositions which are unsuitable for electrical insulation.

The crosslinked compositions of this invention are particularly useful for service as single layer insulation. This single layer serves as the electrical insulator and the jacketing to provide physical and flame protection. They are particularly well suited for low voltage applications involving less than 5000 volts and more commonly less than 600 volts. The crosslinked compositions have a superior balance of properties and do not discolor or tarnish the surface of the copper conductor upon steam curing so that when the insulation is stripped from the end of the wire a clean shiny copper surface is obtained.

EXAMPLES

The invention is described in greater detail in the examples which follow. These examples are for illustration purposes only and are not intended to limit the invention. Numerous variations are possible without deviating from the spirit and scope of the invention, as will be apparent to those skilled in the art.

To prepare the formulations used in the examples the ingredients were added to a Banbury mixer and mixed at a temperature below the decomposition temperature of the peroxide, usually about 110°-125° C., until a homogeneous mixture was obtained. Generally, to achieve uniform dispersion of the compounding ingredients in the copolymer required about 3-5 minutes mixing. The mixture was then sheeted on a roll mill. Prior to extrusion, the sheeted material was granulated to put it in suitable form for introduction into the extruder.

Physical properties (tensile and elongation) of the products were determined in accordance with ASTM D-638. Samples were cured for 6 minutes in a compression mold maintained at 250 psi and 200°-205° C. Under these conditions, cures of 80% or greater with tensile strengths of at least 2000 psi, and more generally greater than 2500 psi, and elongations greater than 200% are typically achieved. Cure levels are determined by measuring the percent gel in accordance with ASTM D-2765, Method C.

Resistance to thermal aging was determined by heating samples in a forced-air circulating oven for 18 days at 163° C. Since the samples become brittle as they deteriorate in the heat aging process, the extent of deterioration was determined by observing the decrease in elongation. Products are considered to be marginal when upon heat aging the elongation drops below 175% or the % retention of the unaged elongation falls below 75%.

Electrical properties (dielectric constant and dissipation factor) of cured compositions were determined in accordance with ASTM D-150.

Extrusions were performed using a 1 inch diameter Brabender extruder having three electrically heated zones and an air-cooled barrel. The extruder had a 20:1 length to screw diameter ratio. A polyethylene-type screw with 20 flites and a 4:1 compression ratio was employed and a pressure gauge was located at the end of the screw at the location where a breaker plate is normally employed. The extruder was equipped to measure the torque required to process the material. The extruder barrel zones 1, 2, and 3 were set at 210° F., 220° F., and 230° F., respectively, and the die temperature was set at 230° F. Screw speed was maintained at 100 rpm.

A Brabender wire insulating die assembled for the insulation of 18 AWG wire was employed. The insulation was applied at a thickness of approximately 20 mils. The coated wire was then steam cured in an autoclave using 250 psi steam for 6 minutes. Six (6) 15 foot strands were cured during each cycle. At the conclusion of the cure cycle, the steam pressure was released and water was introduced. The autoclave was allowed to cool for 12 minutes and the strands then removed and examined for tarnish. This was accomplished by stripping approximately 1 inch of the insulation from the copper wire and visually examining the surface of the wire for any signs of discoloration.

EXAMPLE I

A non-tarnishing flame retardant insulation composition was prepared in accordance with the present invention by formulating an ethylene vinyl acetate copolymer having a VA content of 18% and a MI of about 2.4 as follows:

|  | Parts |
| --- | --- |
| EVA Copolymer | 100.0 |
| Hydrated Alumina | 125.0 |
| Vinyltrimethoxysilane | 1.2 |
| Alpha, alpha'-bis(t-butylperoxy) diisopropyl benzene | 1.6 |
| Lauric Acid | 0.25 |
| Ethylene-bis-stearamide | 0.75 |

-continued

|  | Parts |
|---|---|
| Pentaerythritol tetrakis(betalauryl-thiopropionate)[1] | 0.75 |
| Irganox[2] | 1.5 |

[1] Seenox ™ 412 S, white crystalline powder, melting point 47° C., specific gravity (55° C.) 0.93
[2] Tetrakis[methylene(3,5-di-t-butyl-4-hydroxy-hydrocinnamate)]methane Samples of the composition were prepared and cured to >90% for determination of physical properties. Tensile and elongation were determined initially and then after aging for 7 and 18 days at 163° C. Results were as follows:

| Initial: | |
|---|---|
| Tensile (psi) | 3000 |
| Elongation (%) | 230 |
| After Heat Aging 7 Days: | |
| Tensile (psi) | 3210 |
| Elongation (%) | 220 |
| After Heat Aging 18 Days: | |
| Tensile (psi) | 3100 |
| Elongation (%) | 220 |

The above formulation exhibited good heat stability as evidenced by 104% retention of tensile strength and 96% retention of elongation after 18 days heat aging. Furthermore, the cured composition had good electrical properties and flame retardance. The product had a dielectric constant (1000 Hz) of 3.47, dissipation factor (1000 Hz) of 0.00927, and oxygen index of 24.7.

The formulation exhibited good processability and was readily extrudable as single layer insulation onto 18 AWG copper wire. After steam curing, the surface of the stripped copper conductor was visually examined and showed no evidence of discoloration. The surface of copper was bright and shiny and not discernibly different than that of uncoated wire. Heat aging the extruded steam cured insulated wire for 18 days at 163° C. did not produce any discoloration of the copper conductor.

COMPARATIVE EXAMPLES I AND II

Example I was repeated except that the pentaerythritol tetrakis(betalaurylthiopropionate) was replaced with disterarylthiodipropionate (DSTDP) and dilaurylthiodipropionate (DLTDP). For Comparative Example I, 0.75 phr DSTDP was employed and 0.75 phr DLTDP was used for the composition of Comparative Example II. Amounts and types of all other ingredients and processing conditions were identical to Example I. Processability of the uncured compositions and physical properties of the cured products were essentially identical to that obtained in Example I. However, when the formulations were extruded onto wire and cured using steam significant tarnishing of the conductor surface was observed with both comparative products.

When the insulation layer was stripped from the copper wires coated with the product of Comparative Example I, the metal surface was uniformly dull. Severe darkening of the surface of the copper conducter was observed with the wires which were insulated with the product of Comparative Example II. Heat aging the steam cured insulated wires at 163° C. for 18 days did not appear to increase the amount of tarnish formed on the copper wire.

EXAMPLES II-IV

A series of pentaerythritol tetrakis(betalalkylthiopropionates) wherein the alkyl moiety was varied were prepared and evaluated. The mixed alkyl groups predominantly contained from 8 to 18 carbon atoms and the physical form of these products ranged from liquids to waxy solids. The products were formulated using the recipe set forth in Example I and the resulting compositions cured and physical properties (tensile and percent elongation) determined before and after heat aging. Electrical properties and oxygen index were also determined. Results for each of the three formulations were as follows:

| Product No. | II | III | IV |
|---|---|---|---|
| Initial Tensile (psi) | 2870 | 2850 | 2830 |
| Initial Elongation (%) | 220 | 220 | 210 |
| Percent Retention of Tensile[1] | 106 | 108 | 107 |
| Percent Retention of Elongation[1] | 91 | 91 | 95 |
| Oxygen Index | 25.8 | 26.6 | 25.8 |
| Dielectric Constant (1000 Hz) | 3.63 | 3.37 | 3.50 |
| Dissipation Factor (1000 Hz) | 0.01007 | 0.00520 | 0.00992 |

[1] After 18 days aging at 163° C.

Each of the formulations was also extruded onto 18 AWG copper wire and the insulated wire steam cured. No discoloration or tarnishing of the surface of the copper conductor was observed after steam curing with any of the above formulations. When the flame retardant insulation was removed, the surface of the copper conductor was bright and shiny.

I claim:

1. A copper conductor coated with an insulating layer of a flame retardant composition comprising:
    (a) a polymer selected from the group consisting of copolymers of ethylene and vinyl esters of $C_{2-6}$ aliphatic carboxylic acids, copolymers of ethylene and $C_{1-6}$ alkyl acrylates, copolymers of ethylene and $C_{1-6}$ alkyl methacrylates, or mixtures thereof;
    (b) 80 to 400 phr hydrated inorganic filler;
    (c) 0.5 to 5 phr alkoxysilane;
    (d) 1 to 8 phr chemical crosslinking agent;
    (e) 0.25 to 8 phr processing additive; and
    (f) 1 to 8 phr antioxidant consisting of a combination of (1) a pentaerythritol betaalkylthiopropionate of the formula:

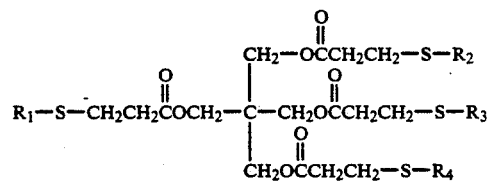

wherein $R_1$, $R_2$, $R_3$, and $R_4$ are alkyl groups having from 8 to 22 carbon atoms and (2) a hindered phenol containing one or more groups of the formula

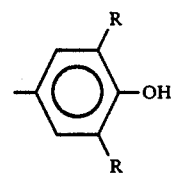

where R is an alkyl group containing from 1 to 4 carbon atoms, with the weight ratio of (1) to (2) ranging from about 5:1 to 1:1.

2. The copper conductor of claim 1 wherein the hindered phenol is selected from the group consisting of 4,4'-methylenebis(2,6-di-t-butylphenol); tetrakis[methylene (3,5-di-t-butyl-4-hydroxyhydrocinnamate)]methane; 1,3,5-trimethyl-2,4,6-tris(3,5-di-t-butyl-4-hydroxybenzyl)-benzene; 1,3,5-tris(3,5-di-t-butyl-4-hydroxybenzyl)-s-triazine 2,4,6(1H,3H,5H)trione; N,N'-bis[3-(3,5-di-t-butyl-4-hydroxyphenyl)propanyl]hydrazine; and octadecyl 3,5-di-t-butyl-4-hydroxyhydrocinnamate.

3. The copper conductor of claim 2 wherein (a) is an ethylene-vinyl acetate copolymer containing from 9% to 30% vinyl acetate and having a melt index from 0.5 to 5, an ethylene-butyl acrylate copolymer containing 10% to 45% butyl acrylate and having a melt index of 0.1 to 3, or mixtures thereof; (b) is hydrated alumina; (c) is a vinylalkoxysilane; (d) is an organic peroxide; and (e) is a fatty acid, a fatty acid derivative, a polymeric resin, a hydrocarbon oil or mixture thereof.

4. The copper conductor of claim 3 wherein (c) is vinyltrimethoxysilane.

5. The copper conductor of claim 3 wherein (d) is dicumyl peroxide or alpha, alpha'-bis(t-butylperoxy)-diisopropylbenzene.

6. The copper conductor of claim 3 wherein (e) is a mixture of a fatty acid and fatty acid amide present at a weight ratio from 2:1 to 1:10.

7. The copper conductor of claim 3 containing 80 to 200 phr (b); 0.75 to 4 phr (c); 1.5 to 5 phr (d); 1 to 6 phr (e); and 1 to 6 phr (f).

8. The copper conductor of claim 7 wherein (e) is a mixture of lauric acid and ethylene-bis-stearamide.

9. The copper conductor of claim 7 wherein (1) is pentaerythritol tetrakis(betalaurylthiopropionate) and (2) is octadecyl 3,5-di-t-butyl-4-hydroxyhydrocinnamate.

10. The copper conductor of claim 9 which is steam vulcanized.

11. The copper conductor of claim 7 wherein (1) is pentaerythritol tetrakis(betalaurylthiopropionate) and (2) is tetrakis[methylene (3,5-di-t-butyl-4-hydroxyhydrocinnate)]methane.

12. The copper conductor of claim 11 which is steam vulcanized.

* * * * *